United States Patent
Yan et al.

(10) Patent No.: US 10,887,871 B2
(45) Date of Patent: Jan. 5, 2021

(54) RESOURCE ASSIGNMENT INDICATION FOR FURTHER EMTC

(71) Applicant: Lenovo Innovations Limited (Hong Kong), Hong Kong (CN)

(72) Inventors: Zhi Yan, Beijing (CN); Xinghua Song, Beijing (CN); Chenxi Zhu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 0 days.

(21) Appl. No.: 16/326,669

(22) PCT Filed: Aug. 17, 2016

(86) PCT No.: PCT/CN2016/095767
§ 371 (c)(1),
(2) Date: Feb. 19, 2019

(87) PCT Pub. No.: WO2018/032435
PCT Pub. Date: Feb. 22, 2018

(65) Prior Publication Data
US 2019/0191428 A1    Jun. 20, 2019

(51) Int. Cl.
*H04W 72/04* (2009.01)
*H04W 4/70* (2018.01)

(52) U.S. Cl.
CPC ......... *H04W 72/0406* (2013.01); *H04W 4/70* (2018.02); *H04W 72/0453* (2013.01)

(58) Field of Classification Search
None
See application file for complete search history.

(56) References Cited

U.S. PATENT DOCUMENTS

| 2013/0039293 A1 | 2/2013 | Lin et al. |
| 2013/0100899 A1* | 4/2013 | Kim ............ H04W 28/16 370/329 |

(Continued)

FOREIGN PATENT DOCUMENTS

| CN | 101984719 A | 3/2011 |
| CN | 104640211 A | 5/2015 |

OTHER PUBLICATIONS

International Searching Authroity, "Notification of Transmittal of the International Search Report and the Written Opinion of the International Searching Authority, or the Declaration", PCT/CN2016/095767, dated Apr. 27, 2017, pp. 1-11.

(Continued)

*Primary Examiner* — Fahmida S Chowdhury
(74) *Attorney, Agent, or Firm* — Kunzler Bean & Adamson

(57) ABSTRACT

Apparatuses, methods, and systems are disclosed for device-to-device transmission. One apparatus includes a receiver that receives a control signal containing a first set of bits indicating a frequency band reference and a second set of bits indicating a frequency band pattern. In such an embodiment, the frequency band pattern is based on a unit size of the frequency band reference. Moreover, the apparatus includes a processor that identifies a resource assignment from both the frequency band reference and the frequency band pattern. In some embodiments, the apparatus includes a transmitter that transmits data on the resource assignment.

28 Claims, 8 Drawing Sheets

(56) References Cited

U.S. PATENT DOCUMENTS

| | | | |
|---|---|---|---|
| 2013/0194950 A1* | 8/2013 | Haghighat | H04W 24/02 |
| | | | 370/252 |
| 2014/0050093 A1* | 2/2014 | Liu | H04W 28/0205 |
| | | | 370/235 |
| 2015/0055570 A1 | 2/2015 | Viorel et al. | |
| 2016/0234707 A1* | 8/2016 | Kazmi | H04W 24/08 |
| 2017/0337691 A1* | 11/2017 | Lim | G06T 7/11 |
| 2018/0069672 A1* | 3/2018 | Horiuchi | H04W 72/0446 |
| 2018/0070339 A1* | 3/2018 | Horiuchi | H04L 5/0053 |
| 2018/0248668 A1* | 8/2018 | Hwang | H04L 5/0094 |
| 2019/0182837 A1* | 6/2019 | Yao | H04W 72/0453 |

OTHER PUBLICATIONS

3GPP, 3rd Generation Partnership Project; Technical Specification Group Radio Access Network; Evolved Universal Terrestrial Radio Access (E-UTRA); Physical channels and modulation (Release 12), 3GPP TS 36.211 V12.6.0, Jun. 2015, pp. 1-136.

* cited by examiner

RESOURCE ASSIGNMENT INDICATION FOR FURTHER EMTC

FIELD

The subject matter disclosed herein relates generally to wireless communications and more particularly relates to indicating resource allocations of user equipments (UEs) using further enhanced machine-type communications (FeMTC).

BACKGROUND

The following abbreviations are herewith defined, at least some of which are referred to within the following description:
3GPP: Third Generation Partnership Project
AP: Access Point
DCI: Downlink Control Information
DL: Downlink
eMTC: Enhanced Machine-Type Communications
eNB: Evolved Node B
FeMTC: Further Enhanced Machine-Type Communications
LTE: Long Term Evolution
OFDM: Orthogonal Frequency Division Multiplexing
PRB: Physical Resource Block
PUCCH: Physical Uplink Control Channel
PUSCH: Physical Uplink Shared Channel
RRC: Radio Resource Control
SC-FDMA: Single-Carrier Frequency-Division Multiple Access
TDD: Time Division Duplex
UE: User Entity/Equipment (Mobile Terminal)
UL: Uplink
WiMAX: Worldwide Interoperability for Microwave Access
WLAN: Wireless Local Area Network In certain wireless communications networks, the system bandwidth is divided into several narrowbands with each eMTC device only occupying at most one narrowband of six contiguous PRBs. The total number of narrowbands is based on the system bandwidth. In a 3GPP LTE network, the number of UL narrowbands is described in Equation 1, where $NB_{Whole}$ is the total number of UL narrowbands and $N_{RB}$ is the number of UL PRBs within the system bandwidth.

$$NB_{Whole} = \left\lfloor \frac{N_{RB}}{6} \right\rfloor \quad \text{Equation 1}$$

Similarly, the total number of DL narrowbands in a 3GPP LTE network is described by Equation 1, where $NB_{Whole}$ is the total number of DL narrowbands and $N_{RB}$ is the number of DL PRBs within the system bandwidth.

In enhanced machine type communication (eMTC), the device only support the bandwidth of six PRBs both for RF and baseband. In LTE communication systems, the resource assignment of eMTC is indicated in DCI for uplink grant and downlink resource assignment. The resource assignment of eMTC includes 2 parts: a narrowband index indicator and a PRB index indicator within the narrowband. However, as eMTC devices increase in popularity there is growing demand for eMTC devices to support higher channel bandwidths, for example, to support voice services and audio streaming.

BRIEF SUMMARY

Apparatuses for indicating FeMTC resource allocations are disclosed herein. Methods and systems also perform the functions of the apparatus. In one embodiment, a remote apparatus for receiving a FeMTC resource allocation includes a receiver that receives a control signal containing a first set of bits indicating a frequency band reference and a second set of bits indicating a frequency band pattern. In such an embodiment, the frequency band pattern is based on a unit size of the frequency band reference. Moreover, the apparatus includes a processor that identifies a resource assignment from both the frequency band reference and the frequency band pattern.

In some embodiments, the apparatus includes a transmitter that transmits data to the base unit using the resource assignment. In some embodiments, the control signal further includes a third set of bits indicating a second frequency band reference and a fourth set of bits indicating a second frequency band pattern. In such embodiments, the processor identifies a second resource assignment from the second frequency band reference and the second frequency band pattern. In certain embodiments, the receiver further receives data on the second resource assignment.

In one embodiment, the frequency band pattern indicates a resource assignment of one and one half frequency bands of the unit size. In another embodiment, the frequency band pattern indicates a resource assignment of one and one third frequency bands of the unit size. In certain embodiments, the frequency band pattern may indicate a resource assignment of two or more non-consecutive frequency bands of the unit size. In other embodiments, the frequency band pattern may indicate a resource assignment of two or more non-consecutive frequency bands of the unit size.

A method of a remote unit for receiving a FeMTC resource allocation, in one embodiment, includes receiving a control signal containing a first set of bits indicating a frequency band reference and a second set of bits indicating a frequency band pattern. In such an embodiment, the frequency band pattern is based on a unit size of the frequency band reference. Moreover, the method includes a identifying a resource assignment from both the frequency band reference and the frequency band pattern.

In one embodiment, a base apparatus for sending a FeMTC resource allocation includes a processor that generates a control signal containing a first set of bits indicating a frequency band reference and a second set of bits indicating a frequency band pattern. In such an embodiment, the frequency band pattern is based on a unit size of the frequency band reference. Moreover, the apparatus includes transmitter that transmits the control signal to a remote unit, the frequency band reference and the frequency band pattern indicating a resource assignment to the remote unit.

In some embodiments, the apparatus includes a receiver that receives uplink data from the remote unit using the resource assignment. In some embodiments, the control signal further includes a third set of bits indicating a second frequency band reference and a fourth set of bits indicating a second frequency band pattern. In such embodiments, the second frequency band reference and the second frequency band pattern indicates a second resource assignment to the remote unit. In certain embodiments, the second resource assignment is a downlink resource assignment.

In one embodiment, the frequency band pattern indicates a resource assignment of one and one half narrowbands. In another embodiment, the frequency band pattern indicates a resource assignment of one and one third narrowbands. In certain embodiments, the frequency band pattern may indicate a resource assignment of two or more non-consecutive narrowbands. In other embodiments, the frequency band pattern may indicate a resource assignment of two or more consecutive narrowbands.

A method for sending a FeMTC resource allocation, in one embodiment, includes generating a control signal containing a first set of bits indicating a frequency band reference and a second set of bits indicating a frequency band pattern. In such an embodiment, the frequency band pattern is based on a unit size of the frequency band reference. Moreover, the method includes transmitting the control signal to a remote unit, the frequency band reference and the frequency band pattern indicating a resource assignment to the remote unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
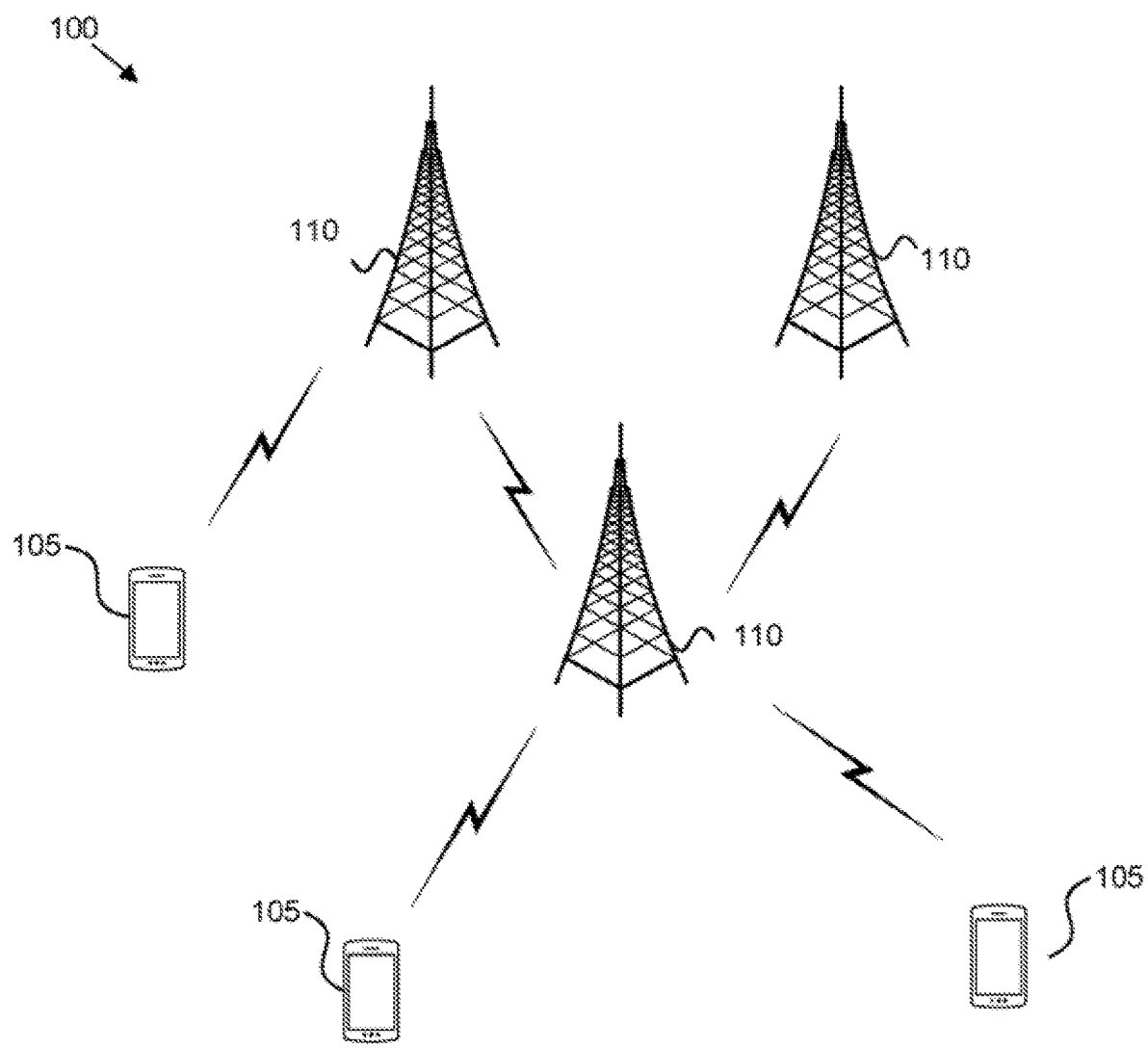
FIG. 1 is a schematic block diagram illustrating one embodiment of a wireless communication system for indicating a FeMTC resource allocation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to support higher channel bandwidths for FeMTC devices, a new resource allocation design is needed. Extending conventional eMTC resource allocation schemes to support larger channel bandwidths than six PRB by indicating each narrowband with a bitmap would result in very high signaling overhead. The embodiments of the disclosure describe using a resource assignment indication that includes a frequency band reference indication (e.g., a narrowband index reference) and frequency band pattern information. The combination of a frequency band reference and a frequency band pattern allows indication of resource allocation greater than one narrowband (e.g., greater than 6 PRB) without increasing signaling overhead.

FIG. 1 depicts an embodiment of a wireless communication system 100 for indicating a FeMTC resource allocation. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one embodiment, the remote units 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115. At least one remote unit 105 communicates using FeMTC.

The base units 110 may be distributed over a geographic region. In certain embodiments, a base unit 110 may also be referred to as an access point ("AP"), an access terminal, a base, a base station, a Node-B, an eNB, a Home Node-B, a relay node, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 may communicate with one or more of the remote units 105 and/or one or more of the base units 110.

The base units 110 connect to a mobile network core via the RAN. In one embodiment, the mobile network core is a 5G (also referred to as "NextGen") packet core or the evolved packet core ("EPC") specified in LTE specifications, which may be coupled to other networks, like the Internet and private data networks, among other data networks. The present disclosure is not intended to be limited to the implementation of any particular wireless communication system architecture or protocol. Thus, in a non-LTE implementation, the base units 110 may be coupled to a non-EPC type of packet core network, such as to a "5G" packet core network. The mobile network core may include controllers and gateways, which are not illustrated, but are known generally by those having ordinary skill in the art. For example, one or more base units 110 may be communicably coupled to a mobility management entity ("MME"), a serving gateway ("SGW"), and/or a packet data network gateway ("PGW"). Further, the wireless communication system 100 may include any number of greater access networks and mobile network cores.

In one implementation, the wireless communication system 100 is compliant with the long-term evolution ("LTE") of the 3GPP protocol, wherein the base units 110 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In some embodiments, a base unit 110 generates a control signal indicating a resource allocation to one or more of the remote units 105. The control signal indicates a frequency band reference and a frequency band pattern, the combination of frequency band reference and a frequency band pattern defining a resource allocation to a remote unit 105. In such embodiment, a remote unit 105 receives the control signal from the base unit 110 and identifies its resource assignment using the frequency band reference and the frequency band pattern. Further, the remote unit 105 may transmit uplink data or receive downlink data on its resource assignment.

Figure 2:
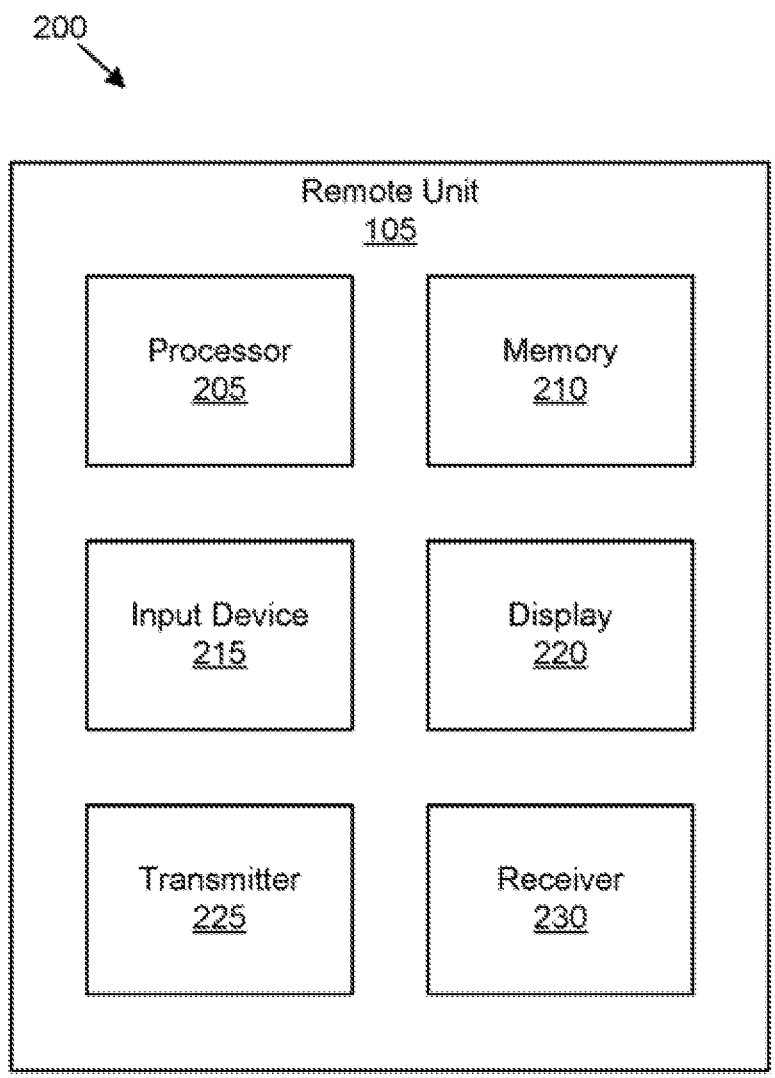
FIG. 2 is a schematic block diagram illustrating one embodiment of an apparatus that may be used for receiving a FeMTC resource allocation.

FIG. 2 depicts one embodiment of an apparatus 200 that may be used for device-to-device transmission. The apparatus 200 includes one embodiment of the remote unit 105. Furthermore, the remote unit 105 may include a processor 205, a memory 210, an input device 215, an output device 220, a transmitter 225, and a receiver 230. In some embodiments, the input device 215 and the output device 220 are combined into a single device, such as a touchscreen. In certain embodiments, the remote unit 105 may not include any input device 215 and/or output device 220. In various embodiments, the remote unit 105 may include one or more of the processor 205, the memory 210, the transmitter 225, and the receiver 230, and may not include the input device 215 and/or the output device 220.

The processor 205, in one embodiment, may include any known controller capable of executing computer-readable instructions and/or capable of performing logical operations. For example, the processor 205 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 205 executes instructions stored in the memory 210 to perform the methods and routines described herein. The processor 205 is communicatively coupled to the memory 210, the input device 215, the output device 220, the transmitter 225, and the receiver 230. In certain embodiments, the processor 205 may identify a resource allocation (e.g., a UL grant or a DL grant) from a control signal received from a base unit 110 via the receiver 230.

Specifically, the processor 205 may interpret a first set of bits in the control signal used for indicating a frequency band reference and a second set of bits used for indicating a frequency band pattern. As discussed above, the frequency band pattern is based on a unit size of the frequency band reference. From the frequency band reference and the frequency band pattern, the processor 205 identifies a resource assignment to the remote unit 105.

In some embodiments, the resource assignment is a grant of uplink resources. In other embodiments, the resource assignment is a grant of downlink resources. In further embodiments, the control signal may include third set of bits indicating a second frequency band reference and a fourth set of bits used for indicating a second frequency band pattern. In such embodiments, the processor 205 may identify a second resource assignment from the second frequency band reference and the second frequency band pattern. Thus, in certain embodiments the control signal may indicate both a grant of UL resource and a grant of DL resources to the same remote unit 105.

The memory 210, in one embodiment, is a computer readable storage medium. In some embodiments, the memory 210 includes volatile computer storage media. For example, the memory 210 may include a RAM, including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In certain embodiments, the memory 210 includes both volatile and non-volatile computer storage media.

In some embodiments, the memory 210 stores data relating to FeMTC resource allocations. For example, the memory 210 may store a control signal containing a first set of bits indicating the frequency band reference and a second set of bits indicating a frequency band pattern. As another example, the memory 210 may store information relating to a resource assignment identified by the processor 205. In some embodiments, the memory 210 also stores program code and related data, such as an operating system or other controller algorithms operating on the remote unit 105.

The input device 215, in one embodiment, may include any known computer input device including a touch panel, a button, a keyboard, a stylus, a microphone, or the like. In some embodiments, the input device 215 may be integrated with the output device 220, for example, as a touchscreen or similar touch-sensitive display. In some embodiments, the input device 215 includes a touchscreen such that text may be input using a virtual keyboard displayed on the touchscreen and/or by handwriting on the touchscreen. In some embodiments, the input device 215 includes two or more different devices, such as a keyboard and a touch panel.

The output device 220, in one embodiment, may include any known electronically controllable display or display device. The output device 220 may be designed to output visual, audible, and/or haptic signals. In some embodiments, the output device 220 includes an electronic display capable of outputting visual data to a user. For example, the output device 220 may include, but is not limited to, a liquid crystal display ("LCD") panel, a light emitting diode ("LED") display panel, an organic light emitting diode ("OLED") display panel, a projector, or similar display device capable of outputting images, text, or the like to a user. As another, non-limiting, example, the output device 220 may include a wearable display such as a smart watch, smart glasses, a heads-up display, or the like. Further, the output device 220 may be a component of a smart phone, a personal digital assistant, a television, a table computer, a notebook (laptop) computer, a personal computer, a vehicle dashboard, or the like.

In certain embodiments, the output device 220 includes one or more speakers for producing sound. For example, the output device 220 may produce an audible alert or notification (e.g., a beep or chime). In some embodiments, the output device 220 includes one or more haptic devices for producing vibrations, motion, or other haptic feedback. In some embodiments, all or portions of the output device 220 may be integrated with the input device 215. For example, the input device 215 and output device 220 may form a touchscreen or similar touch-sensitive display. In other embodiments, the output device 220 may be located near the input device 215.

The transmitter 225 is used to provide UL communication signals to the base unit 110 and the receiver 230 is used to receive DL communication signals from the base unit 110. In one embodiment, the receiver 230 receives a control signal, such as a LTE downlink control information ("DCI") signal, wherein at least a portion of the control signal indicates a resource assignment to the remote unit 105. In such an embodiment, the control signal contains a first set of bits indicating a frequency band reference and a second set of bits indicating a frequency band pattern, where the frequency band pattern is based on a unit size of the frequency band reference. For example, the frequency band reference may be a narrowband index reference (e.g having a unit size of one narrowband) and the frequency band pattern may be a pattern of narrowbands beginning at the referenced narrowband.

In certain embodiments, the control signal may include a third set of bits indicating a second frequency band reference and a fourth set of bits indicating a second frequency band pattern. In such embodiments, the second frequency band reference and the second frequency band pattern indicate a second resource assignment to the remote unit. The first resource assignment may be an uplink resource assignment and second resource assignment may be a downlink resource assignment, or vice versa.

In some embodiments, the transmitter 225 may be used to transmit data (e.g., uplink data) using the resource assignment indicated by control signal. Similarly, in certain embodiments, the receiver 230 may be used to receive data (e.g., downlink data) using the resource assignment indicated by control signal. Although only one transmitter 225 and one receiver 230 are illustrated, the remote unit 105 may have any suitable number of transmitters 225 and receivers 230. The transmitter 225 and the receiver 230 may be any suitable type of transmitters and receivers. In one embodiment, the transmitter 225 and the receiver 230 may be part of a transceiver.

Figure 3:
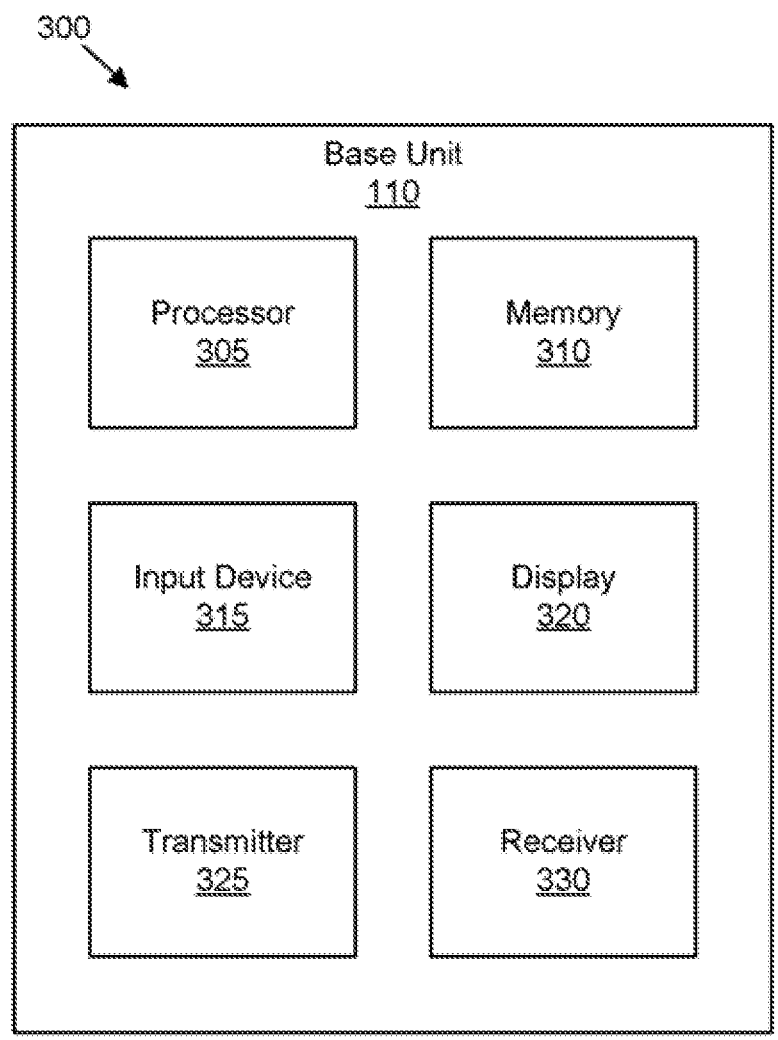
FIG. 3 is a schematic block diagram illustrating one embodiment of an apparatus that may be used for sending a FeMTC resource allocation.

FIG. 3 depicts one embodiment of an apparatus 300 that may be used for configuring device-to-device transmission. The apparatus 300 includes one embodiment of the base unit 110. Furthermore, the base unit 110 may include a processor 305, a memory 310, an input device 315, a display 320, a transmitter 325, and a receiver 330. As may be appreciated, the processor 305, the memory 310, the input device 315, and the display 320 may be substantially similar to the processor 205, the memory 210, the input device 215, and the output device 220 of the remote unit 105, respectively.

The processor 305 is used to generate a control signal indicating a resource assignment to a remote unit 105. Specifically, the processor 305 may generate a first set of bits in the control signal used that indicate a frequency band reference and a second set of bits that indicate a frequency band pattern, with the frequency band pattern being based on a unit size of the frequency band reference. From the frequency band reference and the frequency band pattern, the remote unit 105 identifies a resource assignment.

In some embodiments, the processor 305 generates a control signal indicating resource assignments to a plurality remote unit 105. In further embodiments, the control signal may indicate both a grant of UL resource and a grant of DL resources to the same remote unit 105.

The transmitter 325 is used to provide DL communication signals to the remote units 105 and the receiver 330 is used to receive UL communication signals from the remote units 105. In one embodiment, the transmitter 325 transmits a control signal, such as a LTE downlink control information ("DCI") signal, wherein at least a portion of the control signal indicates a resource assignment to a remote unit 105. In such an embodiment, the control signal contains a first set of bits indicating a frequency band reference and a second set of bits indicating a frequency band pattern, where the frequency band pattern is based on a unit size of the frequency band reference. For example, the frequency band reference may be a narrowband index reference and the frequency band pattern may be a pattern of narrowbands beginning at the referenced narrowband.

In some embodiments, the receiver 330 may receive data (e.g., uplink data) from the remote unit 105 on the resource assignment indicated by control signal. Similarly, in certain embodiments, the transmitter 325 may transmit data (e.g., downlink data) on the resource assignment indicated by control signal. Although only one transmitter 325 and one receiver 330 are illustrated, the remote unit 105 may have any suitable number of transmitters 325 and receivers 330. The transmitter 325 and the receiver 330 may be any suitable type of transmitters and receivers. In one embodiment, the transmitter 325 and the receiver 330 may be part of a transceiver.

Figure 4:
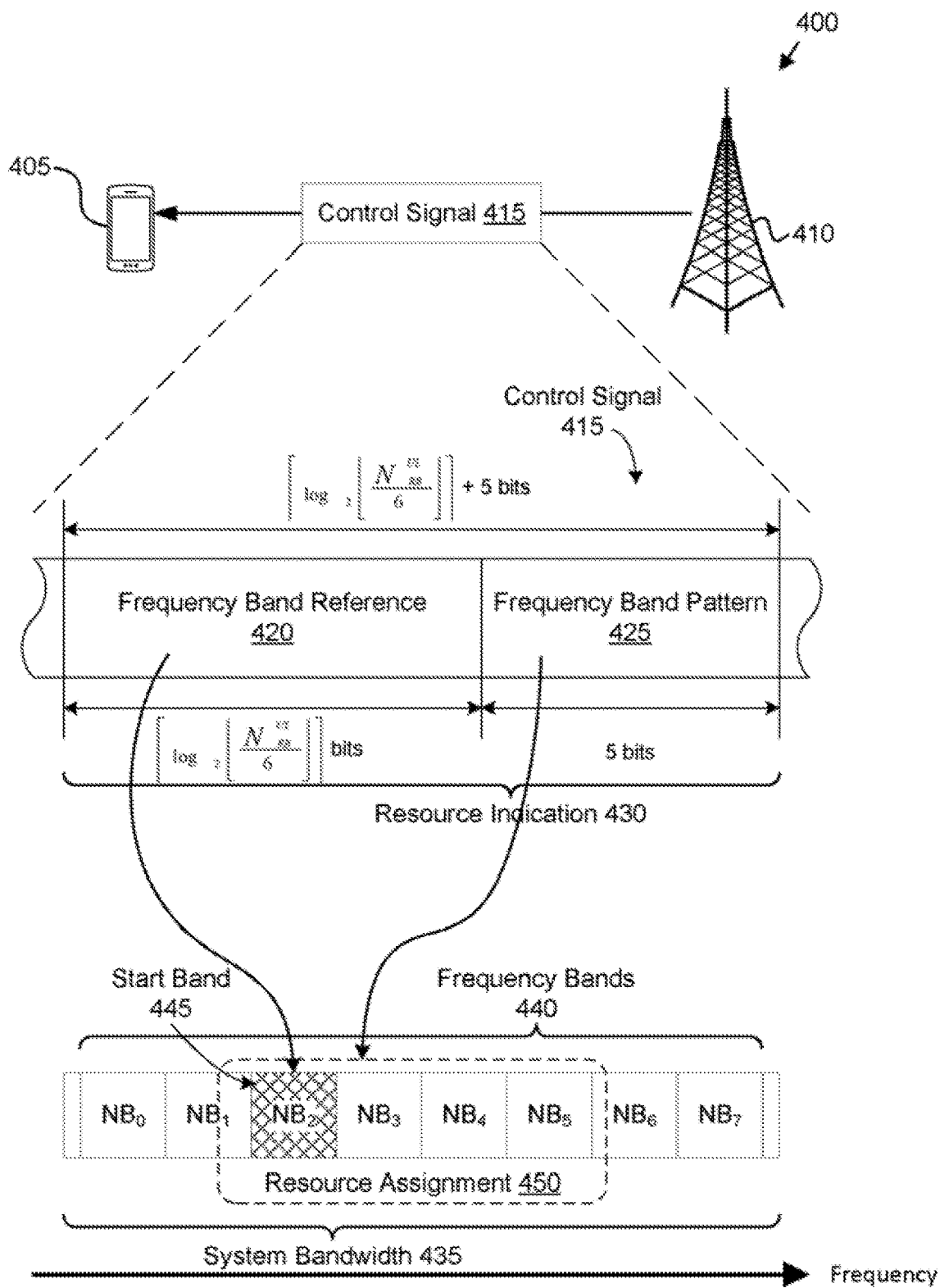
FIG. 4 illustrates one embodiment of communications for indicating a FeMTC resource allocation.

FIG. 4 illustrates one embodiment of communications 400 for indicating a FeMTC resource assignment. Specifically, communications 400 between a UE 405 and an eNB 410 are illustrated. The UE 405 may be one embodiment of a remote unit 105 that uses FeMTC and the eNB 410 may be one embodiment of a base unit 110 that supports FeMTC. As discussed above, the eNB generates and transmits a control signal 415 to the UE 405. The UE 405 receives the control signal 415 and interprets it to identify a resource assignment 450 assigned to the UE 405. Here, the system bandwidth 435 is divided into a plurality of frequency bands 440, the resource assignment 450 indicating one or more frequency bands 440 allocated to the UE 405. In one embodiment, the resource assignment 450 includes more than one frequency bands 440. In a further embodiment, the resource assignment 450 may include a whole frequency band 440 and a part of a frequency band 440 adjacent to (e.g., contiguous with) the whole frequency band 440.

As depicted, the control signal 415 includes two fields used to identify the resource assignment 450: a frequency band reference 420 and a frequency band pattern field 425. In one embodiment, the frequency band reference 420 is a first set of bits in the control signal 415, while the frequency band pattern field 425 is a different (second) set of bits in the control signal 415. Together, the frequency band reference 420 and the frequency band pattern field 425 form a resource indication 430. While only a single resource indication 430 is depicted in FIG. 4, the control signal 415 may include more than one resource indication 430. In one embodiment, the control signal 415 includes a resource indication 430 for each UL resource grant and each DL resource grant in a radio frame, such as a LTE TDD radio frame. In a further embodiment, the control signal 415 may include both a first resource indication 430 indicating a first resource assignment (e.g., a UL resource grant) and a second resource indication 430 indicating a second resource assignment (e.g., a DL resource grant).

In the depicted embodiment, the resource indication 430 uses the same number of bits as LTE DCI Format 6-0/1A, so as not to increase signaling overhead. Specifically, the frequency band pattern field 425 has a length of five bits while the frequency band reference 420 has a bit-length defined in Equation 2, using floor and ceiling functions, where $L_R$ is the number of bits in the frequency band reference 420 and $N_{RB}$ is the number of PRBs (UL or DL) within the system bandwidth.

$$L_R = \left\lceil \log_2 \left\lfloor \frac{N_{RB}}{6} \right\rfloor \right\rceil \quad \text{Equation 2}$$

Thus, the bit-length of the resource indication 430 can be determined using Equation 3, where $L_T$ is the number of bits in the resource indication 430 and $N_{RB}$ is the number of PRBs (UL or DL) within the system bandwidth. The maximum bit-length is nine for a 20 MHz system bandwidth.

$$L_T = \left\lceil \log_2 \left\lfloor \frac{N_{RB}}{6} \right\rfloor \right\rceil + 5 \quad \text{Equation 3}$$

The frequency band reference 420 points to a starting band 445 and the frequency band pattern field 425 defines a pattern of frequency bands (e.g., frequency band pattern) extending from the starting band. In one embodiment, the frequency band reference 420 is a binary number corresponding to the index (e.g., the narrowband index number) of the starting band 445. The resource assignment 450 includes the entire starting band 445. The resource assignment 450 may further include additional frequency resources as indicated by the frequency band pattern. The 5-bit value in the frequency band pattern field 425 indicates a particular pattern of frequency bands. Exemplary frequency band patterns are illustrated in FIGS. 5A-5F.

In some embodiments, each possible 5-bit value in the frequency band pattern field 425 is mapped to a frequency band pattern. In other embodiments, one or more possible 5-bit values may be unused and/or reserved to denote other resource allocation information. For example, LTE DCI Format 6-0/1A uses a 5-bit value to indicate assignment of PRBs within a references narrowband, but only uses twenty-one of the thirty-two possible values. Thus, in some embodiments, the frequency band pattern field 425 may use the eleven 5-bit values unused by LTE DCI Format 6-0/1A to encode pattern of more than one narrowband, thereby increasing interoperability with legacy eMTC devices.

However, in certain embodiments a network operator may desire to define more than eleven frequency band patterns and may separately define resource assignments for normal eMTC bandwidth (e.g., LTE DCI Format 6-0/1A) and the extended FeMTC bandwidth described herein. To avoid confusion with LTE DCI Format 6-0/1A signaling, the control signal 415 may include an indicator bit (not shown) indicating whether the resource indication 430 indicates a frequency band pattern for use with extended (FeMTC) bandwidth or indicates an assignment of normal bandwidth. While the frequency band pattern field 425 is depicted as 5-bits, in certain embodiments, an operator may define fewer frequency band patterns, thus requiring less than 5-bits to encode the supported frequency band patterns. Accordingly, while in the depicted embodiment the resource indication 430 uses the same number of bits as LTE DCI Format 6-0/1A, in other embodiments the resource indication 430 may contain fewer bits (or a greater number of bits) than used in LTE DCI Format 6-0/1A.

In some embodiments, the frequency band pattern field 425 indicates a pattern having a granularity equal to a unit size used by the frequency band reference 420. For example, if the frequency band reference 420 is a narrowband index reference (e.g., pointing to a narrowband), then it has a unit size of one narrowband. Accordingly, in this example the frequency band pattern field 425 indicates a pattern having a granularity equal to one narrowband. Here, the entire narrowband is allocated to the UE 405, so there is no need to indicate assignment of individual PRBs within the narrowband. The narrowband may be any size defined in the mobile communication network, including a 6 PRB narrowband, a 10 PRB narrowband, etc.

In other embodiments, the frequency band pattern field 425 indicates a pattern having a granularity less than a unit size used by the frequency band reference 420 but greater than 1 PRB. For example, the pattern granularity may be one-half of a narrowband (e.g., 3 PRB) or one-third of a narrowband (e.g., 2 PRB). In such embodiments, the frequency band pattern indicated by the frequency band pattern field 425 may correspond to a resource assignment 450 of more than one narrowband (e.g., a fraction of a narrowband greater than one). Any portion of a frequency band 440 not allocated to the UE 405 may be assigned to a normal eMTC device, for example using LTE DCI Format 6-0/1A.

The specific frequency band patterns may be based on the available bandwidth. For example, a 20 MHz system may use a granularity of one narrowband, while a 5 MHz system may use a granularity of one-half of a narrowband. Further, the same value in the frequency band pattern field 425 may correspond to one frequency band pattern in the 20 MHz system and a different frequency band pattern in a 10 MHz system. Additionally, different network operators may map the same 5-bit value to different frequency band patterns.

Figure 5A:
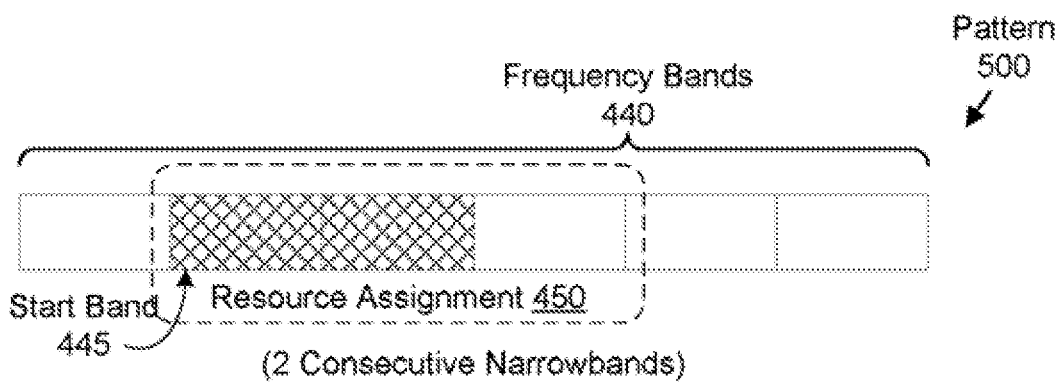
FIG. 5A illustrates a first frequency band pattern usable for indicating a FeMTC resource allocation.

FIG. 5A illustrates one embodiment of a first frequency band pattern 500 used to indicate a FeMTC resource assignment 450. Here, the first frequency band pattern 500 is two consecutive narrowbands. The resource assignment 450 begins at a start band 445, for example a narrowband whose index corresponds to the value in the frequency band reference 420. As illustrated, the resource assignment 450 includes the start band 445 and the next frequency band (e.g., in increasing frequency) to form an allocation of two consecutive narrowbands.

Figure 5B:
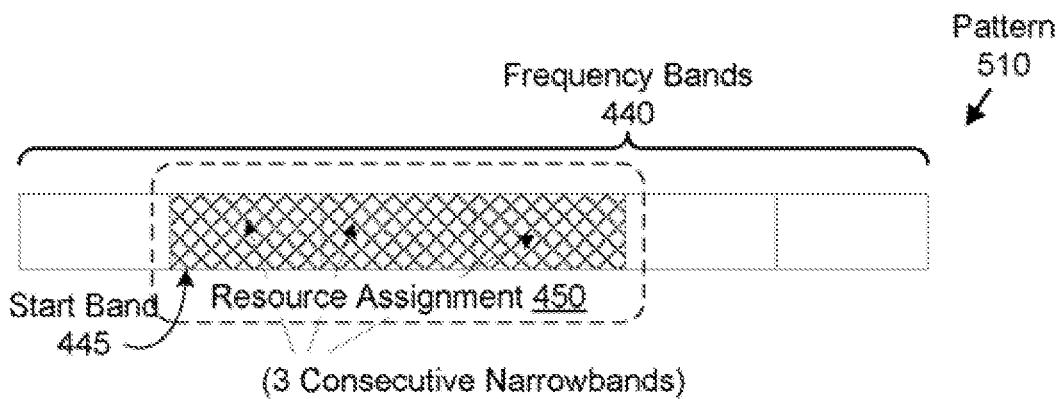
FIG. 5B illustrates a second frequency band pattern usable for indicating a FeMTC resource allocation.

FIG. 5B illustrates one embodiment of a second frequency band pattern 510 used to indicate a FeMTC resource assignment 450. Here, the second frequency band pattern 510 is three consecutive narrowbands. As illustrated, the resource assignment 450 begins at a start band 445 and includes the start band 445 and the next frequency band (e.g., in increasing frequency) to form an allocation of three consecutive narrowbands.

Figure 5C:
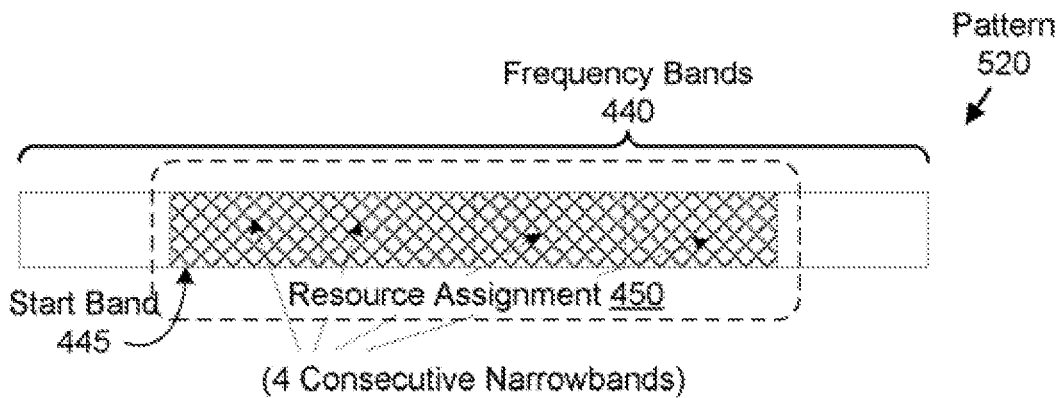
FIG. 5C illustrates a third frequency band pattern usable for indicating a FeMTC resource allocation.

FIG. 5C illustrates one embodiment of a third frequency band pattern 520 used to indicate a FeMTC resource assignment 450. Here, the third frequency band pattern 520 is four consecutive narrowbands. The resource assignment 450 begins at a start band 445, for example a narrowband whose index corresponds to the value in the frequency band reference 420. As illustrated, the resource assignment 450 includes the start band 445 and the next frequency band (e.g., in increasing frequency) to form an allocation of four consecutive narrowbands.

Generally, resource allocations of four narrowbands are sufficient to provide voice services and audio streaming services to the UE 405. In certain embodiments, a UE 405 may be allocated more than four narrowbands, so as to provide higher bandwidth needed, for example, with video streaming/service, multiple simultaneous voice services (or audio streams), etc. Thus, also four narrowbands is the largest resource assignment 450 illustrates, the present disclosure is not to be limited to resource allocations of four narrowbands.

Figure 5D:
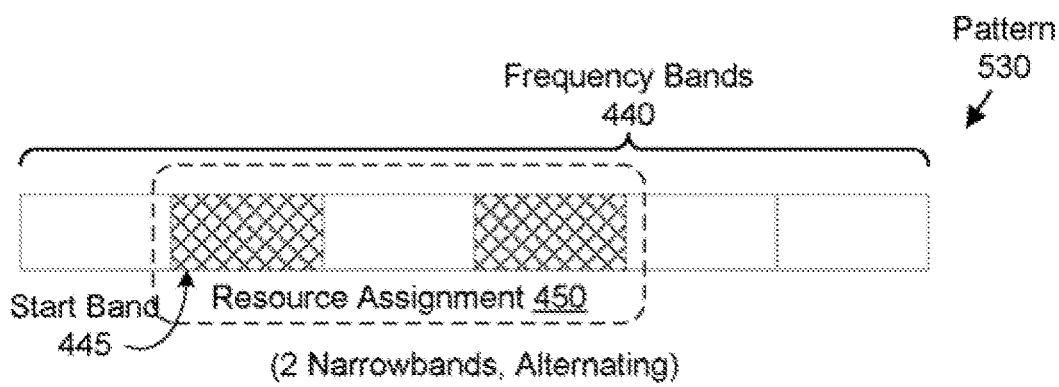
FIG. 5D illustrates a fourth frequency band pattern usable for indicating a FeMTC resource allocation.

FIG. 5D illustrates one embodiment of a fourth frequency band pattern 530 used to indicate a FeMTC resource assignment 450. The fourth frequency band pattern 530 consists of non-continuous allocations. Here, the fourth frequency band pattern 530 is depicted as two non-consecutive narrowbands. As illustrated, the resource assignment 450 begins at a start band 445 and includes the start band 445, a skipped band, and the next frequency band (e.g., in increasing frequency) to form an allocation of two alternating (e.g., non-consecutive) narrowbands.

While depicted as having one unallocated narrowband between the two allocated narrowbands, in other embodiments the two non-consecutive narrowbands may be spaced further apart. In yet other embodiments, the two non-consecutive narrowbands may be spaced closer than one narrowband apart. For example, the two non-consecutive narrowbands may be separated by one-half of a narrowband. Accordingly, the fourth frequency band pattern 530 may be defined to have any amount of unallocated frequency resources between the allocated frequency bands.

Further, the fourth frequency band pattern 530 may have unequal allocation on either side of the unallocated frequency resources. For example, the fourth frequency band pattern 530 may consist of one allocated frequency band, one unallocated frequency band, and two consecutively allocated frequency band for a total of three allocated frequency bands. Still further, the fourth frequency band pattern 530 may have three or more non-consecutive allocations.

Figure 5E:
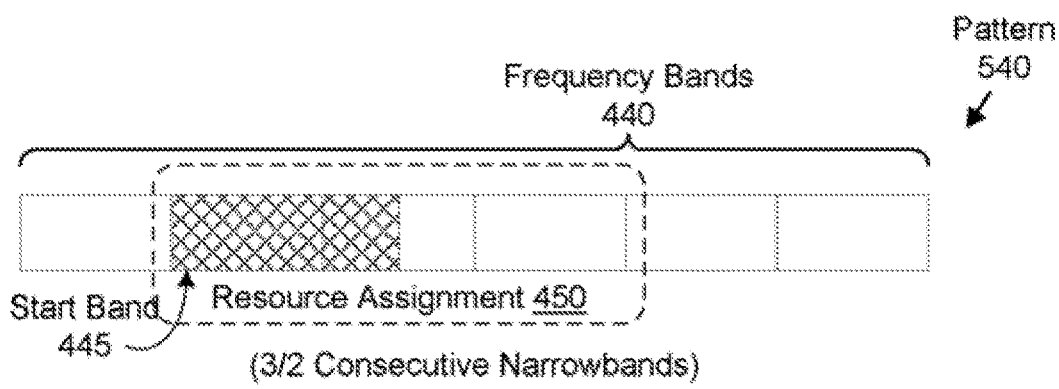
FIG. 5E illustrates a fifth frequency band pattern usable for indicating a FeMTC resource allocation.

FIG. 5E illustrates one embodiment of a fifth frequency band pattern 540 used to indicate a FeMTC resource assignment 450. As discussed above, a frequency band pattern may use a granularity of less than the unit size of the frequency band reference (e.g., less than one narrowband), but more than one PRB. In this embodiment, the fifth frequency band pattern 540 is has a granularity of one-half of a narrowband. Here, the frequency band pattern 540 is depicted as three-halves (3/2) of a narrowband. The resource assignment 450 begins at a start band 445, for example a narrowband whose index corresponds to the value in the frequency band reference 420. As illustrated, the resource assignment 450 includes the start band 445 and one-half of the next frequency band (e.g., in increasing frequency) to form an allocation of three-halves of a narrowband. While depicted as three-halves of a narrowband, in other embodiments the fifth frequency band pattern 540 may be five-halves, seven-halves, or more.

Figure 5F:
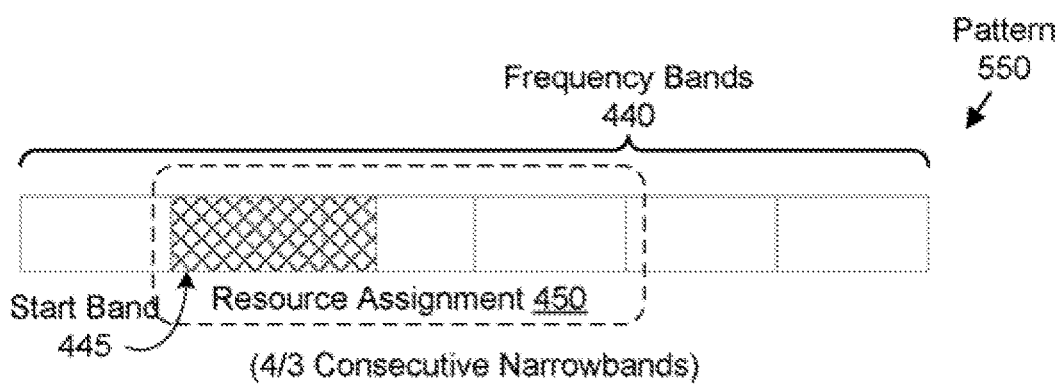
FIG. 5F illustrates a sixth frequency band pattern usable for indicating a FeMTC resource allocation.

FIG. 5F illustrates one embodiment of a sixth frequency band pattern 550 used to indicate a FeMTC resource assignment 450. As discussed above, a frequency band pattern may use a granularity of less than the unit size of the frequency band reference (e.g., less than one narrowband), but more than one PRB. In this embodiment, the sixth frequency band pattern 550 is has a granularity of one-third of a narrowband.

Here, the sixth frequency band pattern 550 is depicted as four-thirds (4/3) of a narrowband. As illustrated, the resource assignment 450 begins at a start band 445 and includes the start band 445 and one-half of the next frequency band (e.g., in increasing frequency) to form an allocation of four-thirds of a narrowband. While depicted as four-thirds of a narrowband, in other embodiments the sixth frequency band pattern 550 may be five-thirds, seven-thirds, or more.

Figure 6:
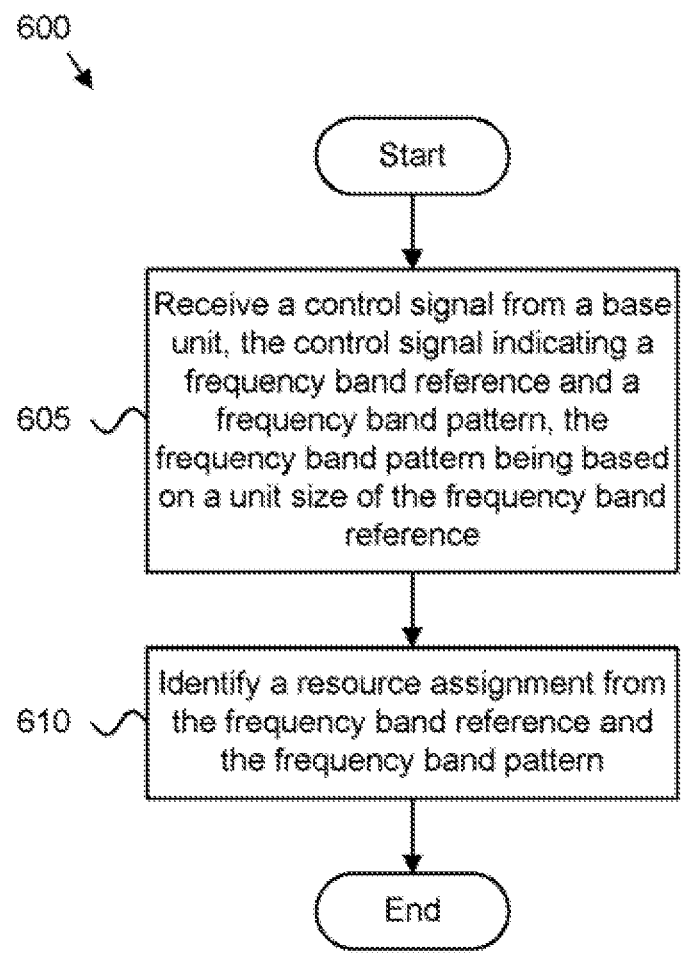
FIG. 6 is a schematic flow chart diagram illustrating one embodiment of a method for receiving a FeMTC resource allocation.

FIG. 6 is a schematic flow chart diagram illustrating one embodiment of a method 600 for receiving a FeMTC resource allocation. In some embodiments, the method 600 is performed by an apparatus, such as the remote unit 105 (e.g., UE). In certain embodiments, the method 600 may be performed by a processor executing program code, for example, a microcontroller, a microprocessor, a CPU, a GPU, an auxiliary processing unit, a FPGA, or the like.

The method 600 may include receiving 605 a control signal indicating a frequency band reference and a frequency band pattern, the frequency band pattern being based on a unit size of the frequency band reference. Examples of frequency band patterns are described above with reference to FIGS. 5A-5F. In some embodiments, the control signal may include a first set of bits indicating the frequency band reference and a second set of bits indicating the frequency band pattern. The method 600 may also include identifying 610 a resource assignment to the remote unit using the frequency band reference and the frequency band pattern, and the method 600 may end.

In some embodiments, the resource assignment is an uplink resource assignment, and the method 600 may include transmitting uplink data to the base unit on the resource assignment. In other embodiments, the resource assignment is a downlink resource assignment and the method 600 may include receiving downlink data from the base unit on the resource assignment. In various embodiments, the control signal further includes a third set of bits indicating a second frequency band reference and a fourth set of bits indicating a second frequency band pattern. In such embodiments, the second frequency band reference and the second frequency band pattern indicate a second resource assignment to the remote unit, with the first resource assignment being an uplink resource assignment and the second resource assignment being a downlink resource assignment.

Figure 7:
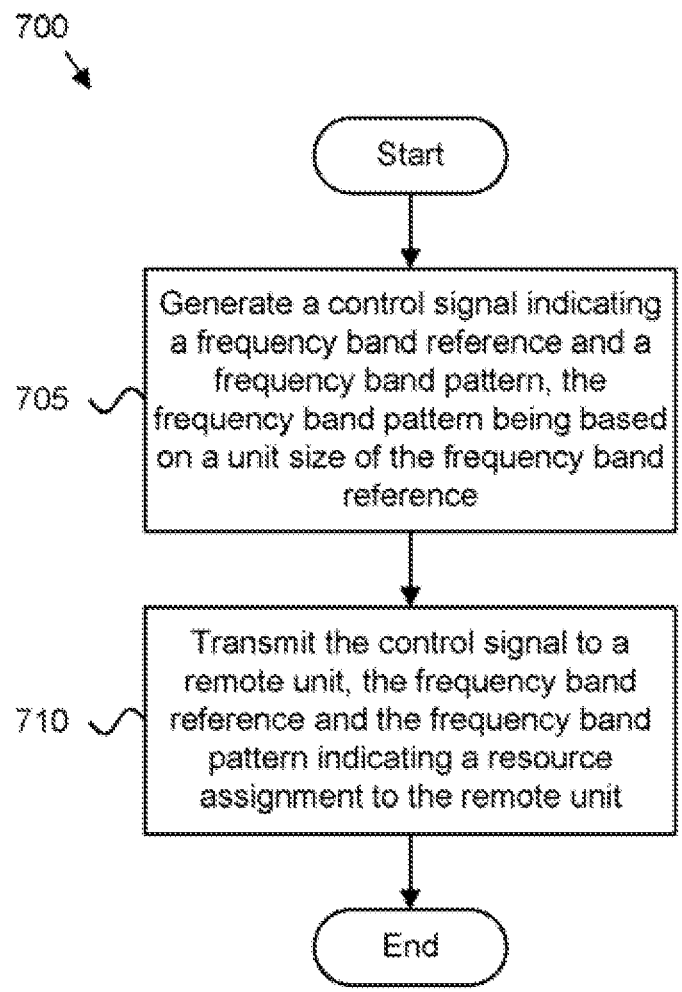
FIG. 7 is a schematic flow chart diagram illustrating one embodiment of a method for sending a FeMTC resource allocation.

FIG. 7 is a schematic flow chart diagram illustrating one embodiment of a method 700 for transmitting a FeMTC resource allocation. In some embodiments, the method 700 is performed by an apparatus, such as the base unit 110 (e.g., eNB). In certain embodiments, the method 700 may be performed by a processor executing program code, for example, a microcontroller, a microprocessor, a CPU, a GPU, an auxiliary processing unit, a FPGA, or the like.

The method 700 may include generating 705 a control signal indicating a frequency band reference and a frequency band pattern, the frequency band pattern being based on a unit size of the frequency band reference. Examples of frequency band patterns are described above with reference to FIGS. 5A-5F. In some embodiments, the control signal may include a first set of bits indicating the frequency band reference and a second set of bits indicating the frequency band pattern. The method 700 may also include transmitting 710 the control signal to a remote unit and the method 700 may end. The frequency band reference and the frequency band pattern indicate a resource assignment to the remote unit.

In some embodiments, the resource assignment is an uplink resource assignment, and the method 700 may include receiving uplink data from the remote unit on the resource assignment. In other embodiments, the resource assignment is a downlink resource assignment and the method 700 may include transmitting downlink data to the remote unit on the resource assignment. In various embodiments, the control signal further includes a third set of bits indicating a second frequency band reference and a fourth set of bits indicating a second frequency band pattern. In such embodiments, the second frequency band reference and the second frequency band pattern indicate a second resource assignment to the remote unit, with the first resource assignment being an uplink resource assignment and the second resource assignment being a downlink resource assignment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that receives a control signal from a base unit, the control signal containing a first set of bits indicating a frequency band reference and a second set of bits indicating a frequency band pattern wherein the first set of bits and the second set of bits are different sets of bits, the frequency band pattern being based on a unit size of the frequency band reference, wherein the unit size of the frequency band reference is a narrowband having six physical resource blocks; and
a processor that identifies a resource assignment from the frequency band reference and the frequency band pattern, wherein the first set of bits indicates a narrowband index of the frequency band reference and the frequency band pattern indicates a pattern of at least two narrowbands beginning at the frequency band reference,
wherein the receiver further receives data on the resource assignment.

2. The apparatus of claim 1, wherein the control signal further includes a third set of bits indicating a second frequency band reference and a fourth set of bits indicating a second frequency band pattern, wherein the processor further identifies a second resource assignment from the second frequency band reference and the second frequency band pattern.

3. The apparatus of claim 2, further comprising:
a transmitter that transmits data on the resource assignment.

4. The apparatus of claim 2, wherein the second frequency band pattern indicates a resource assignment of one and one-half frequency bands of the unit size.

5. The apparatus of claim 2, wherein the second frequency band pattern indicates a resource assignment of one and one-third frequency bands of the unit size.

6. The apparatus of claim 1, wherein the frequency band pattern indicates a resource assignment of two or more non-consecutive frequency bands of the unit size.

7. The apparatus of claim 1, wherein the frequency band pattern indicates a resource assignment of two or more consecutive frequency bands of the unit size.

8. A method comprising:
receiving a control signal from a base unit, the control signal containing a first set of bits indicating a frequency band reference and a second set of bits indicating a frequency band pattern wherein the first set of bits and the second set of bits are different sets of bits, the frequency band pattern being based on a unit size of the frequency band reference, wherein the unit size of the frequency band reference is a narrowband having six physical resource blocks;
identifying a resource assignment from the frequency band reference and the frequency band pattern, wherein the first set of bits indicates a narrowband index of the frequency band reference and the frequency band pattern indicates a pattern of at least two narrowbands beginning at the frequency band reference; and
receiving data on the resource assignment.

9. The method of claim 8, wherein the control signal further includes a third set of bits indicating a second frequency band reference and a fourth set of bits indicating a second frequency band pattern, wherein the method further comprises:
identifying a second resource assignment from the second frequency band reference and the second frequency band pattern.

10. The method of claim 9, further comprising:
transmitting data on the resource assignment.

11. The method of claim 9, wherein the second frequency band pattern indicates a resource assignment of one and one-half frequency bands of the unit size.

12. The method of claim 9, wherein the second frequency band pattern indicates a resource assignment of one and one-third frequency bands of the unit size.

13. The method of claim 8, wherein the frequency band pattern indicates a resource assignment of two or more non-consecutive frequency bands of the unit size.

14. The method of claim 8, wherein the frequency band pattern indicates a resource assignment of two or more consecutive frequency bands of the unit size.

15. An apparatus comprising:
a processor that generates a control signal containing a first set of bits indicating a frequency band reference and a second set of bits indicating a frequency band pattern wherein the first set of bits and the second set of bits are different sets of bits, the frequency band pattern being based on a unit size of the frequency band reference, wherein the unit size of the frequency band reference is a narrowband having six physical resource blocks; and
a transmitter that transmits the control signal to a remote unit, the frequency band reference and the frequency band pattern indicating a resource assignment to the remote unit, wherein the first set of bits indicates a narrowband index of the frequency band reference and the frequency band pattern indicates a pattern of at least two narrowbands beginning at the frequency band reference,
wherein the transmitter further transmits data on the resource assignment.

16. The apparatus of claim 15, wherein the control signal further includes a third set of bits indicating a second frequency band reference and a fourth set of bits indicating a second frequency band pattern, the second frequency band reference and the second frequency band pattern indicating a second resource assignment to the remote unit.

17. The apparatus of claim 16, further comprising a receiver that receives uplink data from the remote unit on the resource assignment.

18. The apparatus of claim 16, wherein the second frequency band pattern indicates a resource assignment of one and one-half frequency bands of the unit size.

19. The apparatus of claim 16, wherein the second frequency band pattern indicates a resource assignment of one and one-third frequency bands of the unit size.

20. The apparatus of claim 15, wherein the frequency band pattern indicates a resource assignment of two or more non-consecutive frequency bands of the unit size.

21. The apparatus of claim 15, wherein the frequency band pattern indicates a resource assignment of two or more consecutive frequency bands of the unit size.

22. A method comprising:

generating a control signal containing a first set of bits indicating a frequency band reference and a second set of bits indicating a frequency band pattern wherein the first set of bits and the second set of bits are different sets of bits, the frequency band pattern being based on a unit size of the frequency band reference, wherein the unit size of the frequency band reference is a narrowband having six physical resource blocks;

transmitting the control signal to a remote unit, the frequency band reference and the frequency band pattern indicating a resource assignment to the remote unit, wherein the first set of bits indicates a narrowband index of the frequency band reference and the frequency band pattern indicates a pattern of at least two narrowbands beginning at the frequency band reference; and transmitting data on the resource assignment.

23. The method of claim 22, wherein the control signal further includes a third set of bits indicating a second frequency band reference and a fourth set of bits indicating a second frequency band pattern, the second frequency band reference and the second frequency band pattern indicating a second resource assignment to the remote unit.

24. The method of claim 23, further comprising receiving uplink data from the remote unit on the resource assignment.

25. The method of claim 23, wherein the second frequency band pattern indicates a resource assignment of one and one-half frequency bands of the unit size.

26. The method of claim 23, wherein the second frequency band pattern indicates a resource assignment of one and one-third frequency bands of the unit size.

27. The method of claim 22, wherein the frequency band pattern indicates a resource assignment of two or more non-consecutive frequency bands of the unit size.

28. The method of claim 22, wherein the frequency band pattern indicates a resource assignment of two or more consecutive frequency bands of the unit size.

* * * * *